United States Patent
Yanase

(10) Patent No.: US 6,774,776 B2
(45) Date of Patent: Aug. 10, 2004

(54) METHOD AND APPARATUS FOR ALARMING DECREASE IN TIRE AIR-PRESSURE

(75) Inventor: Minao Yanase, Kobe (JP)

(73) Assignees: Sumitomo Rubber Industries, Ltd., Kobe (JP); Sumitomo Electric Industries, Ltd., Osaka (JP)

( * ) Notice: Subject to any disclaimer, the term of this patent is extended or adjusted under 35 U.S.C. 154(b) by 3 days.

(21) Appl. No.: 10/207,192

(22) Filed: Jul. 30, 2002

(65) Prior Publication Data

US 2004/0021557 A1 Feb. 5, 2004

(51) Int. Cl.$^7$ ............................................. B60C 23/00
(52) U.S. Cl. ........................ 340/444; 340/442; 340/669; 73/146.5
(58) Field of Search ................................. 340/444, 443, 340/442, 445, 447, 449, 669, 670, 671, 672; 73/146.5, 146.2; 116/34 R; 180/282

(56) References Cited

U.S. PATENT DOCUMENTS

| 5,343,741 A | * | 9/1994 | Nishihara et al. | 73/146.2 |
| 5,591,906 A | * | 1/1997 | Okawa et al. | 73/146.5 |
| 6,034,595 A | * | 3/2000 | Yanase | 340/444 |
| 6,118,369 A | * | 9/2000 | Boesch | 340/443 |

FOREIGN PATENT DOCUMENTS

| JP | 5-055322 | 8/1993 |
| JP | 6-008713 | 1/1994 |
| JP | 8-501040 | 2/1996 |
| JP | 8-164720 | 6/1996 |

* cited by examiner

Primary Examiner—Daniel J. Wu
Assistant Examiner—Phung Nguyen
(74) Attorney, Agent, or Firm—Birch, Stewart, Kolasch & Birch, LLP

(57) ABSTRACT

A method for alarming a decrease in tire air-pressure, in which rotational numbers of four tires are detected for judging whether any of the tire air-pressures is decreased or not, and issuing an alarm if the internal pressure of a tire is decreased. In an equation for calculating a judged value for detecting deflation of a tire, correction factor function values including a first factor related to lateral acceleration of the vehicle and a second factor related to lateral acceleration and front and rear wheel ratios are subtracted from actually measured values when performing actual running of the vehicle with the tires being set to specific air-pressures. The first and second factors are calculated such that a result of subtraction is approximately close to zero and is stored. It is possible to improve accuracy of detection of deflations of tires by automatically obtaining factors for turning correction after mounting the tires to the vehicle.

2 Claims, 2 Drawing Sheets

METHOD AND APPARATUS FOR ALARMING DECREASE IN TIRE AIR-PRESSURE

BACKGROUND OF THE INVENTION

1. Field of the Invention

The present invention relates to a method and an apparatus for alarming a decrease in tire air-pressure. More particularly, the present invention relates to a method and an apparatus for alarming a decrease in tire air-pressure which are applicable to repair markets and for setting optimal correction factors for the attached tires.

2. Description of Background Art

Apparatuses for detecting a decrease in tire air-pressure through relative comparison of wheel speeds have been conventionally suggested (for instance, in Japanese Examined Patent Publication No. 55322/1993 and others). In such apparatuses, diagonal sums of wheel speeds are compared or judgment is performed only when the vehicle is performing straight-ahead running in which the number of disturbance factors is small for improving accuracy of detection. However, the chances for detecting deflation during only straight-ahead running is remarkably decreased so that it takes a long time to detect deflation. This is especially true when a turning condition is combined with lateral acceleration. In this case, a large lateral acceleration will apply when the vehicle is running at high speed even if the turning movements are made at a large turning radius that is close to straight-ahead driving. Such a situation might result in bursts without any deflation being detected, or when performing running on a mountainous road in which turning movements continue, bead dislodgement will be caused. With the aim of improving such problems, there has been suggested an apparatus in which judgment of deflation is made to be performed also during turning movements and which corrects the judged values with a function introducing therein lateral acceleration and other factors (Japanese Unexamined Patent Publication No. 8713/1994, Japanese Published Patent Publication No. 501040/1996 and Japanese Unexamined Patent Publication No. 164720/1996 and others).

However, since shifts in judged values during turning are corrected in these apparatuses, tuning operations are preliminarily performed for each combination of types of cars/tires for obtaining factors for correction. Conversely, it is necessary to preliminarily obtain factors for turning correction in order to properly make the apparatuses for alarming decrease in air-pressure function. Such apparatuses are thus not appropriate for use in repair markets in which it cannot be foretold to which types of cars the apparatuses are mounted.

It was further necessary for conventional apparatus to set factors capable of preventing large shifts in corrections when the tires are exchanged, for example, from summer tires to winter tires.

SUMMARY OF THE INVENTION

The present invention has been made in view of the above facts, and it is an object thereof to provide an apparatus and a method for alarming a decrease in tire air-pressure which are capable of automatically obtaining factors for turning correction and of improving the accuracy of detection of deflation of a tire after fixing a tire to a vehicle.

In accordance a the first aspect of the present invention, there is provided a method for alarming a decrease in tire air-pressure, in which rotational numbers of four tires are detected for judging, on the basis of the detected rotational numbers, whether any of the tire air-pressures is decreased or not, and issuing an alarm in case an internal pressure of a tire is decreased, wherein in an equation for calculating a judged value for detecting deflation of a tire upon comparing differences of two diagonal sums, correction factor function values including a first factor related to lateral acceleration of the vehicle and a second factor related to lateral acceleration and front and rear wheel ratios are subtracted from actually measured values when performing actual running of the vehicle with the tires being set to specific air-pressures, and the first and second factors are so calculated that a result of subtraction is approximately close to zero and are stored.

In accordance with a second aspect of the present invention, there is provided an apparatus for alarming a decrease in tire air-pressure, in which rotational numbers of four tires are detected for judging, on the basis of the detected rotational numbers, whether any of the tire air-pressures is decreased or not, and issuing an alarm in case an internal pressure of a tire is decreased, the apparatus comprising: a speed detecting means for detecting wheel speeds of the respective tires; a calculating means for calculating and processing a judged value for deflation in which differences between two diagonal sums of rotational numbers of front tires and rotational numbers of rear tires are compared on the basis of the rotational numbers which are obtained from the wheel speeds detected by the speed detecting means; and an optimal factor calculating means in which correction factor function values including a first factor related to lateral acceleration of the vehicle and a second factor related to lateral acceleration and front and rear wheel ratios are calculated by subtracting them from actually measured values when performing actual running of the vehicle with the tires being set to specific air-pressures, and the first and second factors are so calculated that a result of substraction is approximately close to zero and are stored.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The method and apparatus for alarming a decrease in tire air-pressure according to the present invention will now be explained with reference to the accompanying drawings.

Figure 1:
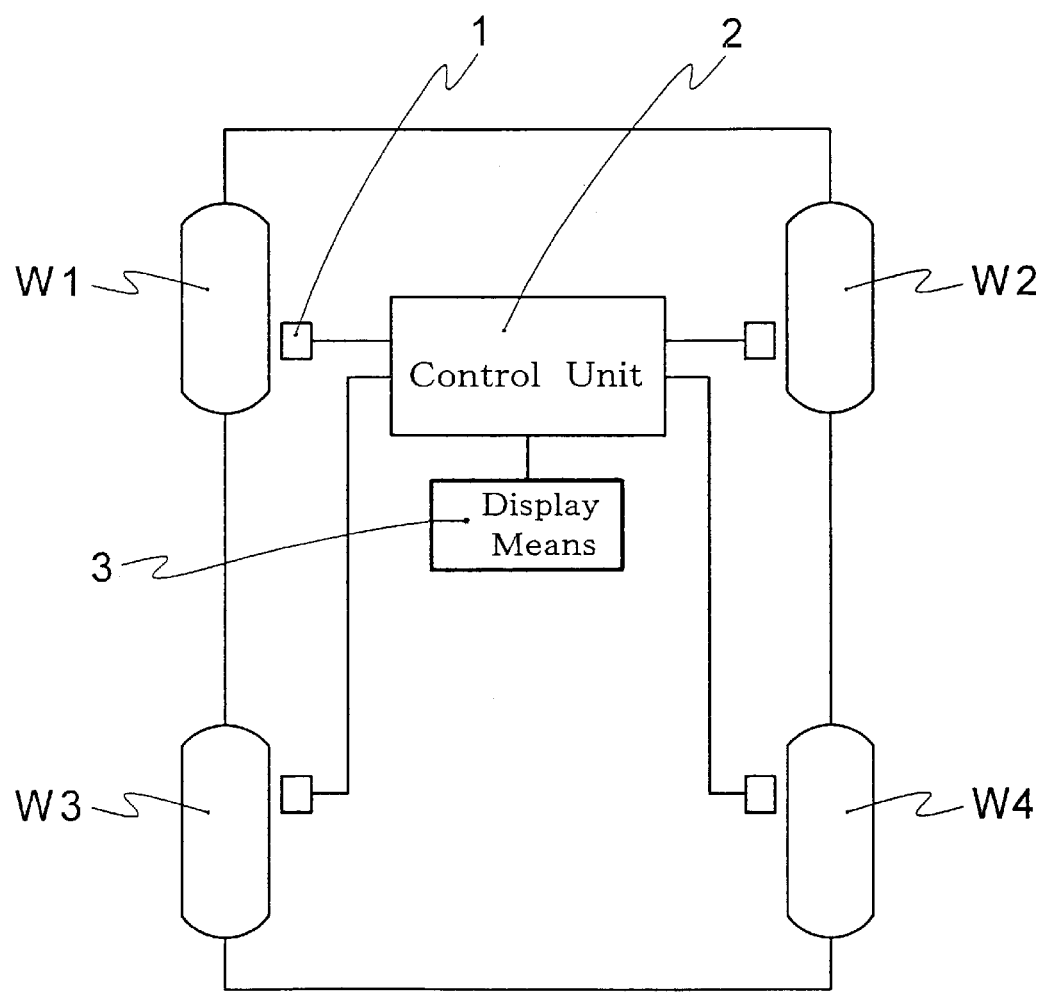
FIG. 1 is a block diagram illustrating one embodiment of the apparatus for alarming decrease in tire air-pressure according to the present invention.
Figure 2:
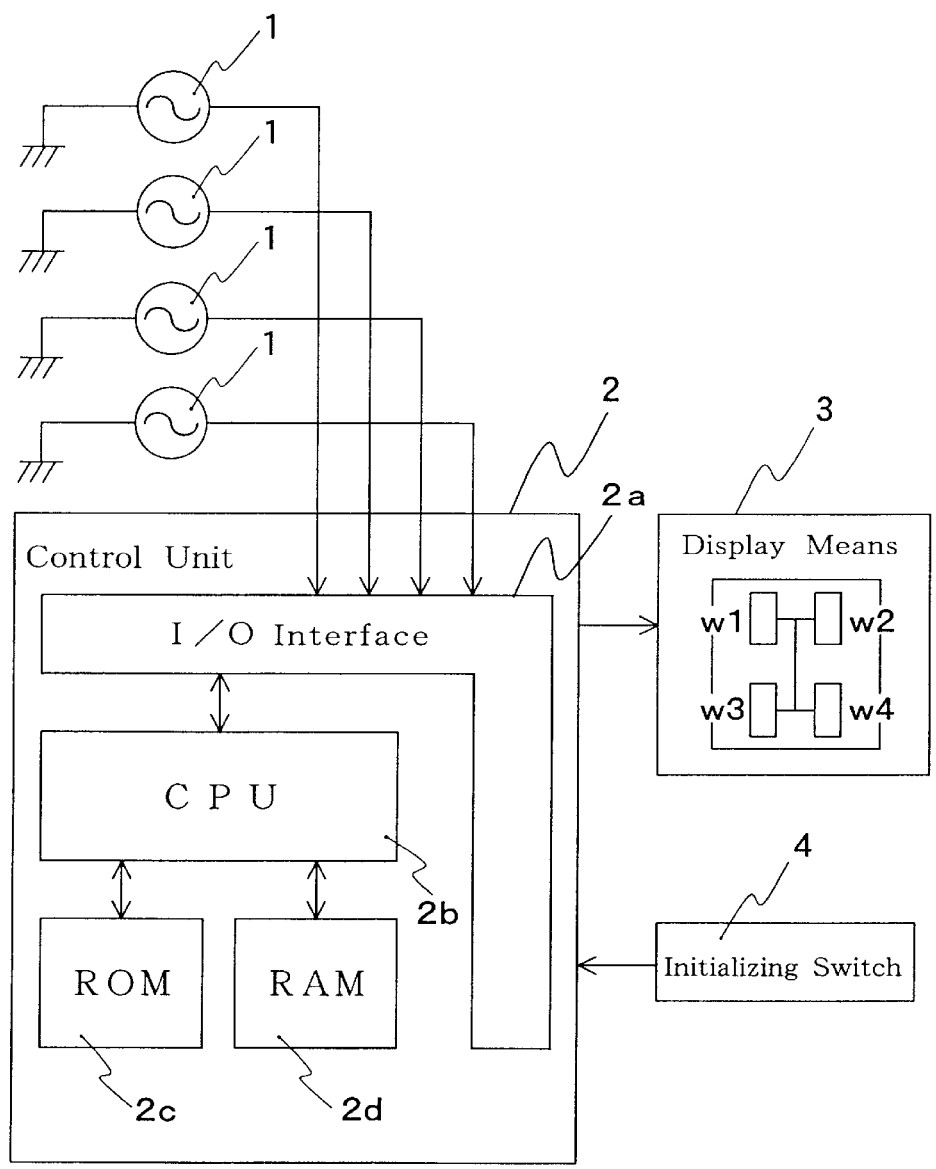
FIG. 2 is a block diagram illustrating electric arrangements of the apparatus for alarming decrease in tire air-pressure of FIG. 1.

As illustrated in FIG. 1, the apparatus for alarming a decrease in tire air-pressure according to one embodiment of the present invention is for detecting whether the air-pressures of any of the four tires $W_1$, $W_2$, $W_3$ and $W_4$ attached to a four-wheeled vehicle is decreased or not, and includes ordinary wheel speed sensors provided in relation with the respective tires $W_1$, $W_2$, $W_3$ and $W_4$. Outputs of the wheel speed sensors 1 are sent to a control unit 2. A display means 3 comprising liquid crystal elements, plasma display elements or a CRT and an initializing switch 4 which might be operated by a driver are connected to the control unit 2.

The control unit 2 comprises an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations. The calculating means and the optimal factor calculating means of the present embodiment are included in the control unit 2.

Pulse signals corresponding to the rotational number of tires $W_i$ (hereinafter referred to as "wheel speed pulse") are output from the vehicle speed sensors 1. In the CPU 2b, rotational angular velocities $F_i$ for respective tires $W_i$ are calculated on the basis of the wheel speed pulses as output from the wheel speed sensors 1 at specified sampling periods $\Delta T(\sec)$, for instance, $\Delta T=1$.

Since the tires $W_i$ are manufactured to include variations (initial differences) within standards, effective rolling radii of the respective tires $W_i$ (a value obtained by dividing a distance that has been traveled by a single rotation by $2\pi$) are not necessarily identical even though all of the tires $W_i$ are at normal internal pressure. This will result in variations in the rotational angular velocities $F_i$ of the respective tires $W_i$. Thus, corrected rotational angular velocities $F1_i$ to cancel variations owing to initial differences are calculated. Concretely, correction is made as in the equation shown below.

$F1_1 = F_1$ $F1_2 = mF_2$ $F1_3 = F_3$ $F1_4 = nF_4$

The correction coefficients m and n are obtained as $m=F_1/F_2$ and $n=F_3/F_4$ on the basis of rotational angular velocities $F_i$ which have been calculated on the premise that the vehicle is performing straight-ahead driving.

The speed V of the vehicle, lateral acceleration (lateral G) thereof or the like is calculated on the basis of the $F1_i$.

Conventionally, factors for turning correction are known to be related to either lateral G of vehicles or (lateral G×driving force), which are obtained through the following process steps.

1) A vehicle with tires that are set to specified air-pressures is made to run on specified turning radii at various speeds and is then made to perform neutral running (that is, the driving force is set to zero). The lateral G at this time is calculated for obtaining a relationship thereof with the judged value. A constant of this relative equation is defined to be a first factor f1 related to lateral G.

2) The vehicle is then made to perform turning at various speeds on specified turning radii at a constant speed, that is, with driving force being applied thereon. The lateral G at this time is calculated for correcting the judged value by the first factor as obtained in 1) above. Since the driving force is given by (front and rear wheel ratio−1), front and rear ratio (which is given as $(V_3+V_4)/(V_1+V_2)$ when the speeds of the four wheels are defined to be $V_i$ in case of a FR vehicle) are calculated as a characteristic value related to the driving force for obtaining a relationship between the corrected judged value and {lateral G×(front and rear wheel ratio−1)}. The constant of this relative equation is defined to be a second factor f2.

3) The judged value that underwent turning correction (DEL') is calculated as follows on the basis of the judged value before correction (DEL):

$$DEL' = DEL - F(f1, f2) \quad (1)$$

Here, F(f1, f2) is a correction factor function value which is given by $F(f1, f2) =$ lateral $G \times f1 +$ lateral $G \times$(front and rear wheel ratio−1)$\times f2$ For obtaining the judged value deflation (DEL) for detecting decrease in air-pressure of tire Wi, differences between two diagonal sums of, for instance, the front wheel tires and the rear wheel tires are compared, wherein a sum of signals of one pair of wheels located on one diagonal line is subtracted from a sum of signals of the other pair of wheels located on the other diagonal line, and a ratio of this obtained value to an average value of the two sums is obtained based on the following equation (2).

$$DEL = 2 \times \{(V_1+V_4)-(V_2+V_3)\}/(V_1+V_2+V_3+V_4) \times 100(\%) \quad (2)$$

Since the correction coefficients f1, f2 vary depending on combinations of the types of vehicles/tires, values for f1 and f2 are preliminarily obtained for any thinkable combinations with tires for setting averaged values for f1, f2 to be stored in the system. However, when applying such a system to repair markets, turning correction will become difficult since it cannot be foretold to what kind of types of vehicles/tires the system will be mounted. Moreover, since averaged factors as preliminarily calculated from various combinations of various tires are used also in new-car markets, it might happen that errors are caused during correction depending on combinations.

Thus, it has been devised in the present invention to automatically obtain the correction factors after the system has been mounted to the vehicle.

In the ordinary system for detecting a decrease in air-pressure on the basis of relative comparison of wheel speeds, it is obligatory to perform processes for properly setting air-pressures when exchanging tires and performing initialization. At the stage when initialization has been almost completed, the judged value (DEL) will be zero at the time of straight-ahead running. When turning correction is appropriately performed, the value will also be zero at the time of turning.

Thus, the above equation (1) is replaced as:

Evaluated function = actual $DEL - F(f1, f2)$ and values for f1, f2 through which the evaluated function becomes closer and closer to zero are obtained. With this arrangement, the system will become applicable also to repair markets. The thus obtained correction coefficients f1, f2 are optimized in view of the type of vehicle/tires the system is presently mounted to so that it is possible to improve accuracy of detection.

While the present invention will now be explained on the basis of an example thereof, the present invention is not to be limited to such an example.

EXAMPLE

A small sized FF vehicle (with tire sizes of 195/50R15) was provided, and correction coefficients f1, f2 (example a)

were obtained at the time when tuning was preliminarily performed while correction coefficients f1, f2 (example b) were further obtained during actual running through multiple regression. Comparison of both correction factors f1, f2 lead to results as listed in Table 1.

TABLE 1

|                        | Example a | Example b |
|------------------------|-----------|-----------|
| Correction coefficient f1 | −0.057    | −0.064    |
| Correction coefficient f2 | 159.9     | 158.6     |

It could be understood from the above that although both slightly differ from each other, the differences were not of a level which would cause any problems in performances. It is accordingly possible to improve accuracy of detection of deflations of tires by using the correction coefficients f1, f2 of example b which have been calculated during actual running.

As explained so far, according to the present invention, it is possible to improve accuracy of detection of deflations of tires by automatically obtaining factors for turning correction after mounting the tires to the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for alarming a decrease in tire air-pressure, in which rotational numbers of four tires are detected for judging, on the basis of the detected rotational numbers, whether any of the tire air-pressures is decreased or not, and issuing an alarm if the internal pressure of a tire is decreased, said method comprising the steps of:

calculating a judged value for detecting deflation of a tire by comparing differences between two diagonal sums of rotational numbers of front tires and rear tires;

subtracting correction factor function values from actually measured values when performing actual running of the vehicle with the tires being set to specific air-pressures, said correction factor function values including a first factor related to lateral acceleration of the vehicle and a second factor related to lateral acceleration and front and rear wheel ratios, the first and second factors being calculated such that a result of the subtraction is approximately close to zero; and storing the first and second factors.

2. An apparatus for alarming decrease in tire air-pressure, in which rotational numbers of four tires are detected for judging, on the basis of the detected rotational numbers, whether any of the tire air-pressures is decreased or not, and issuing an alarm if the internal pressure of a tire is decreased, the apparatus comprising:

a speed detecting means for detecting wheel speeds of the respective tires;

a calculating means for calculating and processing a judged value for deflation in which differences between two diagonal sums of rotational numbers of front tires and rotational numbers of rear tires are compared on the basis of the rotational numbers which are obtained from the wheel speeds detected by the speed detecting means; and an optimal factor calculating means in which correction factor function values including a first factor related to lateral acceleration of the vehicle and a second factor related to lateral acceleration and front and rear wheel ratios are subtracted from actually measured values when performing actual running of the vehicle with the tires being set to specific air-pressures, and the first and second factors are calculated such that a result of the subtraction is approximately close to zero and are stored.

* * * * *